(No Model.) 6 Sheets—Sheet 1.

C. W., A. & J. METTLER.
SCREW MACHINE.

No. 561,415. Patented June 2, 1896.

Fig. 1

Witnesses:
Arthur B. Jenkins.
C. E. Buckland.

Inventor
Adolf Mettler.
Jacob Mettler.
Caspar W. Mettler
by Chas. L. Burdett
Attorney (No Model.) 6 Sheets—Sheet 3.

C. W., A. & J. METTLER.
SCREW MACHINE.

No. 561,415. Patented June 2, 1896.

(No Model.) C. W., A. & J. METTLER.
SCREW MACHINE.

No. 561,415. Patented June 2, 1896.

Witnesses.
Arthur B. Jenkins.
C. E. Buckland.

Inventors:
Adolf Mettler.
Jacob Mettler.
Caspar W. Mettler.
Chas. L. Burdett
Attorney.

(No Model.) 6 Sheets—Sheet 5.
C. W., A. & J. METTLER.
SCREW MACHINE.

No. 561,415. Patented June 2, 1896.

(No Model.) 6 Sheets—Sheet 6.
C. W., A. & J. METTLER.
SCREW MACHINE.

No. 561,415. Patented June 2, 1896.

Witnesses.
Arthur B. Jenkins,
C. E. Buckland,

Inventors.
Adolph Mettler.
Jacob Mettler,
Caspar W. Mettler
by Chas. L. Burdett
Attorney

UNITED STATES PATENT OFFICE.

CASPAR W. METTLER, ADOLF METTLER, AND JACOB METTLER, OF HARTFORD, CONNECTICUT.

SCREW-MACHINE.

SPECIFICATION forming part of Letters Patent No. 561,415, dated June 2, 1896.

Application filed September 18, 1895. Serial No. 562,396. (No model.)

*To all whom it may concern:*

Be it known that we, CASPAR W. METTLER, a citizen of the United States, and ADOLF METTLER and JACOB METTLER, citizens of the Republic of Switzerland, residents of Hartford, in the county of Hartford and State of Connecticut, have invented certain new and useful Improvements in Screw-Machines, of which the following is a full, clear, and exact description, whereby any one skilled in the art can make and use the same.

Our invention relates to the class of machines which are arranged and adapted to automatically cut from a length of wire or rod blanks which are formed into screws or like articles; and the object of the invention is to provide a machine of this class in which the several operations shall be accurately and automatically performed by a simple construction of the feeding and cutting devices.

To this end our invention consists in the details of the several parts making up the machine as a whole and in the combination of the parts, as more particularly hereinafter described, and pointed out in the claims.

Referring to the drawings.

Figure 1:
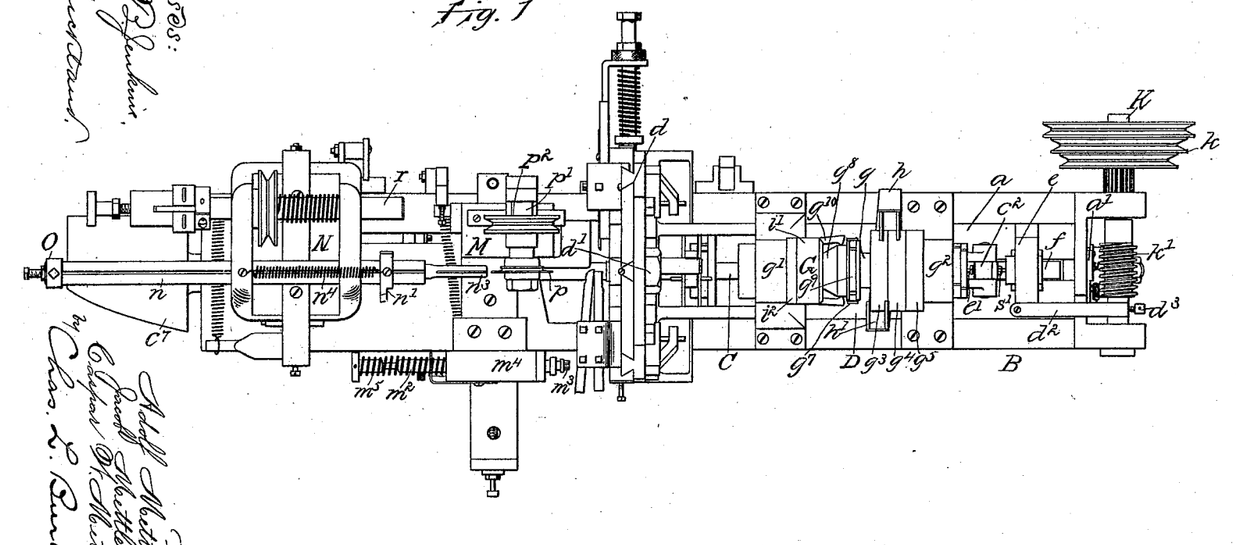
Figure 1 is a top or plan view of the machine embodying our improvements.
Figure 2:
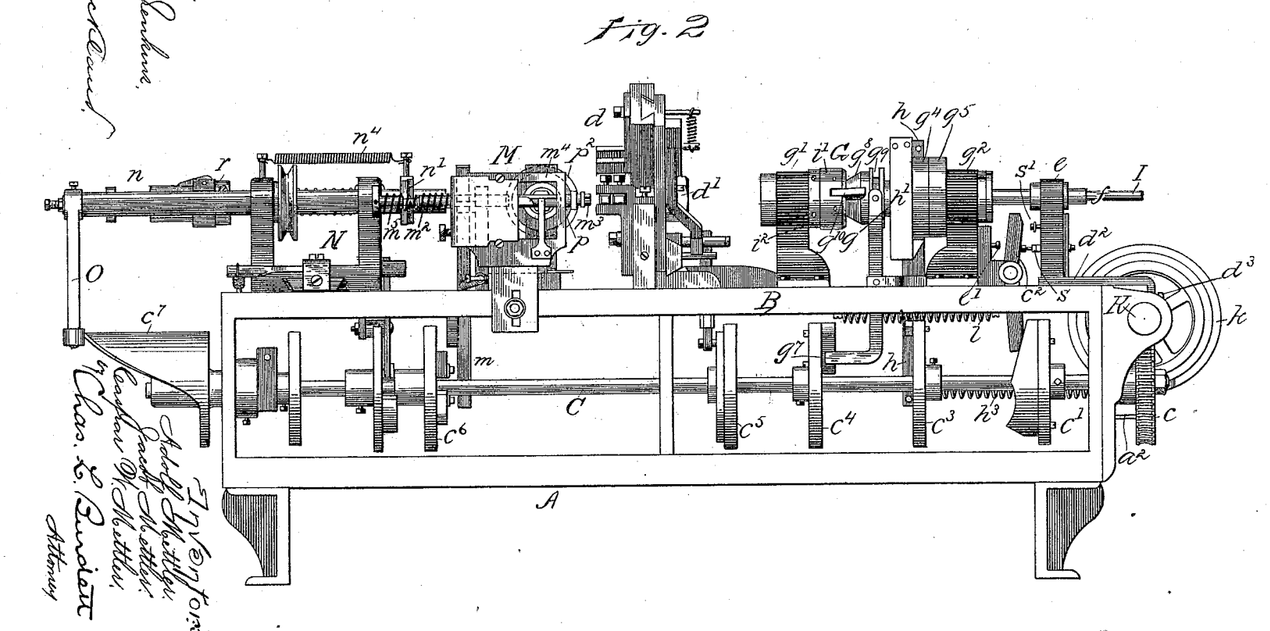
Fig. 2 is a view in side elevation of the machine with parts cut away to show construction.
Figure 3:
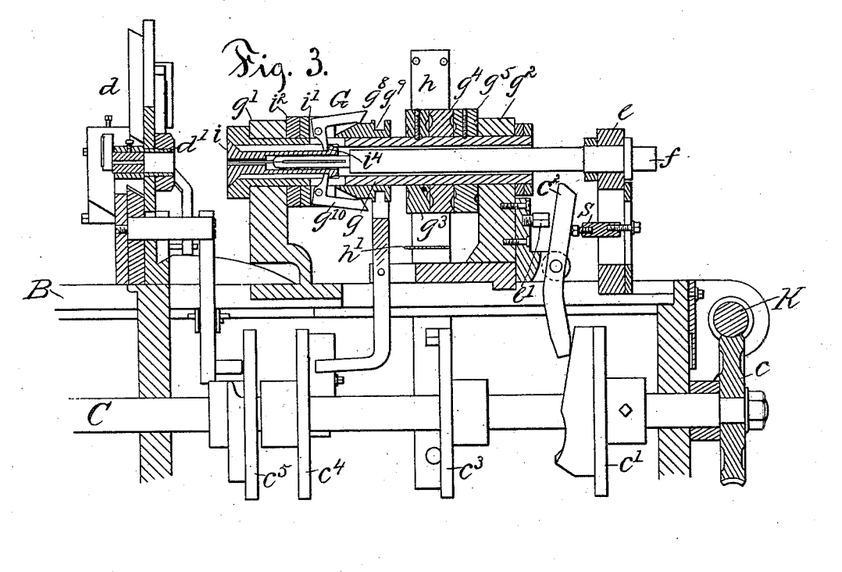
Fig. 3 is a detail view, in central vertical section, through that part of the machine bearing the chuck and showing the construction of the latter.
Figure 4:
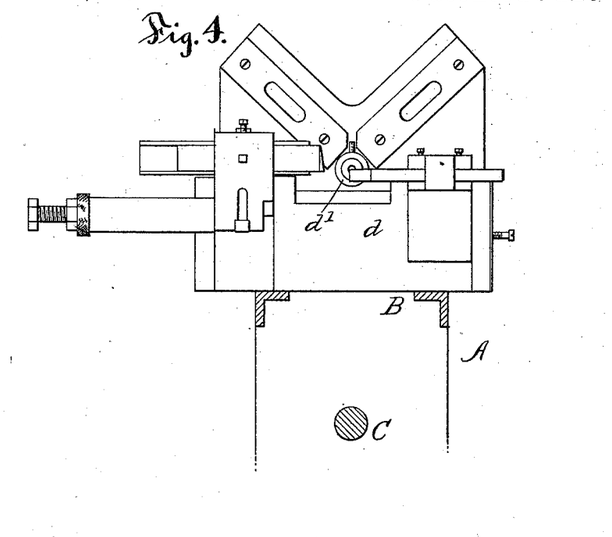
Fig. 4 is a detail view, in vertical cross-section, on a line passing through the machine to the left of the tool-head, as shown in Fig. 1, and looking toward the tool-head.
Figure 5:
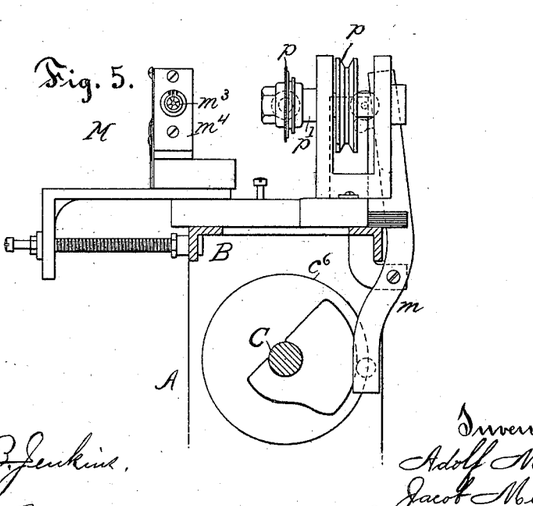
Fig. 5 is a detail view, in vertical cross-section, through the machine on the same plane as Fig. 4 and looking away from the tool-head.
Figure 6:
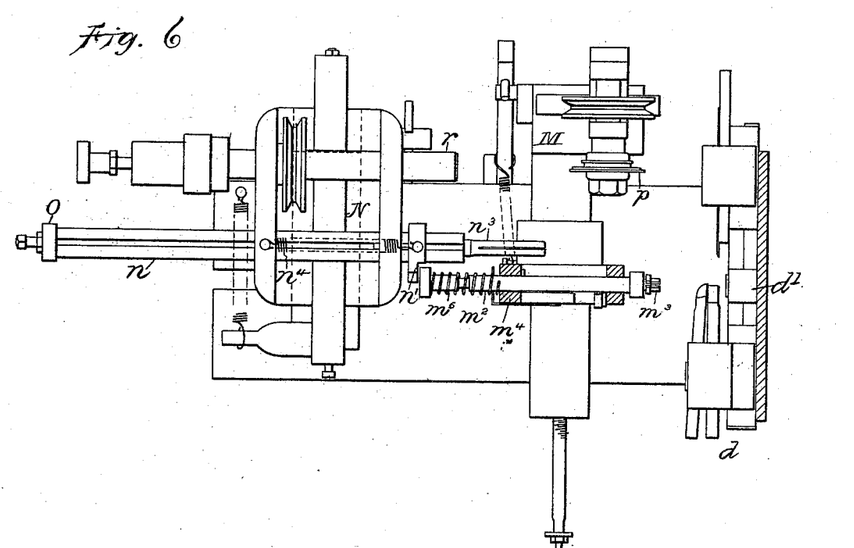
Fig. 6 is a detail diagram view in plan of a portion of that part of the machine to the left of the tool-head, as seen in Fig. 1, and showing the parts in a position for the die to be thrust forward to cut a thread on the blank.
Figure 7:
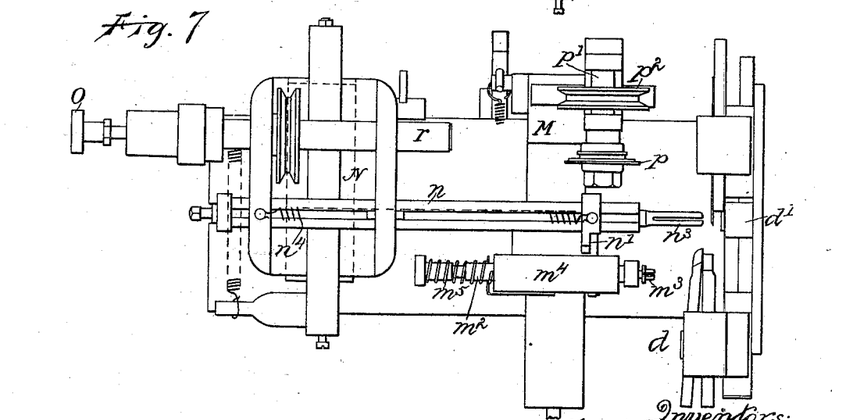
Fig. 7 is a like view showing the parts in position for the plunger to grasp the severed blank.
Figure 8:
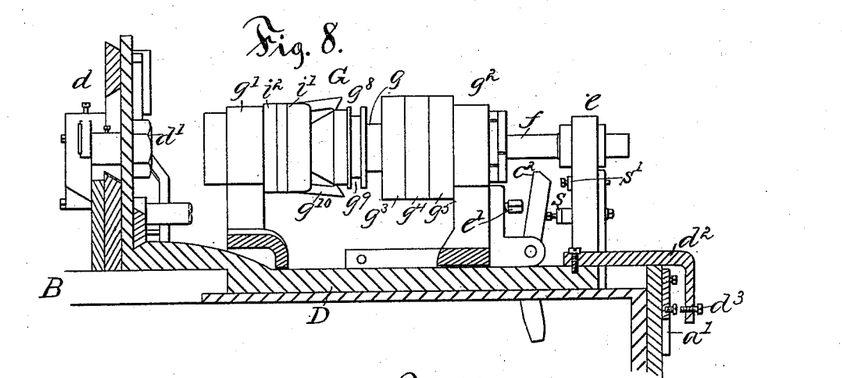
Fig. 8 is a detail front view, in vertical section, through the bed of the machine and through the carriage in a vertical plane just in front of the fixed standards supporting the chuck.
Figures 9, 10, 11, 12, 13, 14:
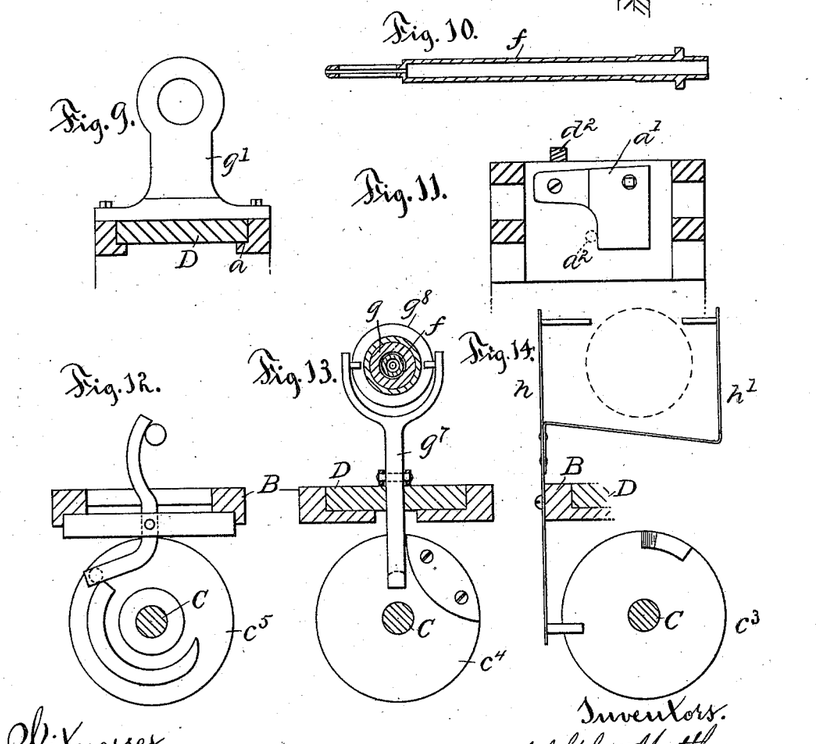
Fig. 9 is a detail view, in vertical crosswise section, through the bed of the machine and through the carriage between the fixed standards supporting the chuck.
Fig. 10 is a detail view, in central lengthwise section, through the frictional clamp.
Fig. 11 is a detail view, in vertical crosswise section, of the bed on a line drawn centrally through the bearings of the driving-shaft and showing the pivoted stop on one end of the machine.
Fig. 12 is a detail view, in vertical crosswise section, through the bed of the machine, showing the tool-slide cam.
Fig. 13 is a detail view, in vertical crosswise section, of a portion of the machine, showing the cam for operating the chucking-cone.
Fig. 14 is a detail view, in vertical crosswise section, of a portion of the machine, showing the cam for operating the belt-shifter lever.

In the accompanying drawings the letter A denotes the frame of the machine, which is made in any desired form, and preferably of metal, as iron cast to shape with standards, the bed B being supported on or forming a part of the frame, and a cam-shaft C extending lengthwise of the frame and below the bed and turning in suitable bearings provided for it.

The carriage D is mounted in a guideway $a$ in the bed underlying standards $g'$ $g^2$ and is so arranged as to have a lengthwise-sliding movement for a limited distance in the frame, a tool-head $d$ being arranged in an upright position on the front end of the carriage, while at the rear end the standard $e$, secured to the carriage, supports the frictional clamp $f$, which forms part of the rod-feed mechanism.

Between the tool-head and the standard on the carriage the chuck G is mounted in bearings in fixed standards $g'$ and $g^2$, fast to the bed, the chuck-shaft $g$ being tubular and so mounted as to permit of a rotary movement in its bearings. The chuck-shaft is driven by means of belts passing around the pulleys $g^3$, $g^4$, and $g^5$ on the chuck-shaft. Two of the pulleys are fixed on the shaft and the other, in the form shown the middle pulley, is loose on the same shaft, the belt-shifters $h$ and $h'$ being pivoted to the bed and arranged to automatically shift the belt from the fast to the loose pulley and the reverse.

The tool-head $d$ has an opening in line with the axis of the chuck-shaft, and in that opening a bushing $d'$ may be secured, as by means of a clamp-screw, the hole through the bushing being of a size to closely fit the blank-rod from which the article, as a screw, is to be cut. This rod of stock I is inserted at the rear of the machine, passing through the frictional clamp therein, through the hollow chuck, and through the bushing in the tool-head, holding the rod with a frictional grasp strong enough to prevent any accidental movement of the rod within it and the chuck as its jaws are clamped upon the rod and holding it securely. The rod rotates about its axis with the chuck, the frictional clamp $f$ being arranged in a loose sleeve, which rotates in a fixed bearing or standard on the rear end of the carriage. This clamp is hollow, the rod of stock extending lengthwise through it, and the clamp at one end is slitted lengthwise for a short distance, the portions between the slits forming spring-fingers, which exert a frictional grasp upon the rod of stock. The opposite end of the clamp contains an annular groove constructed in any desired manner, the flanges forming the walls of the groove lying on opposite sides of the standard $e$ in such manner that the clamp may be freely rotated within the standard, but is compelled to move lengthwise therewith. As the support is moved backward, and with it the clamp, the rod of stock is held by the grasp of the chuck-jaws, and when the support is moved forward, and with it the frictional clamp, the chuck-jaws release their grasp, and the frictional grasp of the clamp is sufficient to force the rod of stock through between the chuck-jaws.

The limit of forward movement of the carriage D is determined by a stop $e'$, consisting of an adjustable screw in the side of the standard $g^2$, against which the lever $c^2$ strikes in the forward movement. The extent of lengthwise movement of the carriage determines the length of the blank which will be operated upon in the return movement of the carriage and by the tools borne on the tool-head thereon. Means for determining this extent of lengthwise movement of the carriage and of the length of the body and of the head of the manufactured screw will be hereinafter described.

A driving-shaft K is mounted across the end of the frame in suitable bearings, a pulley $k$ on the outer end of the shaft being adapted to receive a belt and a worm $k'$ on the shaft being arranged to mesh with a worm-gear $c$, that is fast to the end of the cam-shaft. On the cam-shaft is arranged the carriage-feed cam $c'$, which thrusts against the lower end of the lever $c^2$, which is pivoted to a bracket fast to the side of the fixed standard $g'$, the upper end of this lever $c^2$ by contact with a bearing on the standard $e$ thrusting the carriage backward against the tension of the spring $l$, one end of which is secured to the carriage and the other to the bed and on the lower side thereof.

The belt-shifter lever is operated by the cam $c^3$, fast to the cam-shaft, a pin projecting from the lower end of the lever $h$, which is pivoted to the side of the bed, being held in contact with the cam by means of a spring $h^3$, one end of which is secured to the lever and the other to a fixed point on the bed.

The chuck-lever $g^7$ is pivoted to a bracket fast to the standard $g^2$ or some other fixed portion of the frame, the lower end projecting in the path of movement of a cam $c^4$, fast to the cam-shaft, while the upper end is forked, so as to extend on opposite sides of the chucking-cone $g^8$, pins near the ends of the fork taking into a groove $g^9$ at the base of the cone. A forward movement of the cone causes the levers $g^{10}$ to close the jaws of the chuck upon the rod of blank stock which is located between them.

The forming and cutting-off tools are borne on slides on the tool-head, and these tools are operated by levers pivoted to the frame, and with their lower ends bearing pins which project in the path of movement of the tool-slide cams $c^5$, which are fast to the cam-shaft. Next in front of the tool-head is arranged a slide M, which is moved transversely across the bed of the machine by means of a lever $m$, pivoted to the bed and with its lower end projecting into the path of movement of the cam $c^6$. The upper end of this lever thrusts against the carriage and causes it to move in one direction against the pull of a spring which draws the carriage in the reverse direction, one end of the spring being secured to the lever and the other end to the carriage.

The machine as illustrated herein is adapted to making a screw with a threaded portion and a slotted rounded head. The die-plunger $m^2$, the forward end of which bears the dies $m^3$, is supported in a socket in the open bracket $m^4$ on the slide, this plunger being rotary and held at the outer limit of its play by a spring $m^5$, one end thrusting against the under side of a head on the outer end of the plunger and the other against the end of the bracket. This plunger is provided with a device of ordinary construction for determining the cutting operation of the die and for throwing off and reversing it, the means for accomplishing this consisting of a pin projecting from the side of the plunger and operating with a shoulder or fixed portion of the bracket along which the pin slides until its end is reached. As soon as the pin reaches the end of this slide it is thrown over past it and the recoil of the spring withdraws the tap. There is nothing particularly novel in this portion of the machine.

The plunger is fed up to cut the thread on the projecting end of the blank by means of the plunger $n$, mounted in the bracket N, a shoulder $n'$ on the feed-plunger $n$ striking against the head of the die-plunger $m^2$ and causing the latter to move forward. As soon as the thread has been cut and the die-plunger withdrawn the slide M is moved over out of the line of the axis and the head N', which has a transverse sliding movement of the bed, is moved by means of a cam and lever until the plunger $n$ is brought into the line of the axis of the chuck, and while held in this position the plunger is moved lengthwise until the friction-clutch $n^3$, borne on its inner end, has grasped the projecting end of the rod of stock, from which the blank for the screw is then cut by a cutting-off tool, and as soon as it is severed the plunger $n$ is withdrawn by the recoil of the spring $n^4$, the cam $c^7$ on the end of the cam-shaft having moved the lever O at proper times to cause the feed-plunger $n$ to be moved forward to permit the friction-clutch to grasp the screw-blank and releasing the lever at the proper time to permit the feed-plunger to be withdrawn, carrying with it the screw, the head of which projects slightly from the outer end of the clutch. As soon as the feed-plunger has reached the outer limit of its play the slide M is moved across the bed until the saw $p$, secured to a shaft $p'$, which is mounted in bearings on the slide and driven by a belt passing over a pulley $p^2$, fast to the shaft, is located in line of the axis of the feed-plunger $n$. As soon as the saw is in the proper position the feed-plunger is again moved forward by the cam $a$ a distance sufficient to enable a transverse slot to be cut in the head of the screw. The screw is automatically released from the friction-clutch and discharged from the machine, as by means of a plunger located within the friction-clutch and resting against or in close proximity to the inner end of the screw, said plunger bearing a pin projecting through a slot in the friction-clutch that encounters a stop in the backward movement of the clutch, forcing the plunger forward against the screw and it from the grasp of the clutch.

On the head N' is arranged a rotary clutch-spindle $r$, which may be used if desired; but it has no purpose in connection with the cutting of a screw as described, and for which the machine is set and arranged, as illustrated in the accompanying drawings.

The chucking mechanism consists of the hollow chuck-shaft $g$, mounted in the standards $g'$ $g^2$, as hereinbefore described, the walls of the opening in the shaft at the inner end being beveled and flaring outward, the chuck-jaws $i$ being located in this opening. These chuck-jaws have their outer ends beveled to fit the beveled surface on the chuck-shaft, whereby the jaws are opened and closed in their lengthwise movement in the shaft caused by the chuck-levers $g^{10}$. These chuck-levers are pivoted in a lever-support $i'$ on the chuck-shaft $g$, said support being adjustable toward and from the chuck-cone $g^8$ for the purpose of varying the extent of radial movement of the outer end of the jaws in the reciprocation of the chuck-cone. This adjustment is secured by means of a chuck-jaw adjuster $i^2$, consisting of a split ring fitting a threaded portion of the shaft, clamp-screws being used to secure the ring against rotation on the shaft when a desired adjustment has been secured. This ring and lever-support are so connected that a simultaneous movement lengthwise on the chuck-shaft is compelled, but the ring is free to turn independent of the lever-support, the latter being held against rotation on the chuck-shaft.

The chuck-jaws are formed integral each with the other, a round piece of metal having a central opening lengthwise therethrough and split lengthwise for a portion of its length being used, and the jaws are formed on one end. The other end of this piece of metal on which the jaws are formed has an annular shoulder $i^4$, located in the path of movement of the inner ends of the chuck-jaw levers $g^{10}$, and by which they are pulled into the chuck-shaft $g$ and closed. This direct connection between the chuck-jaw levers and chuck-jaws forms an important feature of our invention.

In order to adapt the machine to the cutting of different lengths of blanks without alteration of the carriage-feed cam $c'$, and also to enable the machine to cut screws having bodies and heads of varying thicknesses, the following mechanism is provided: The length of the screw-blank is determined by the extent of lengthwise movement of the carriage, the point at which the carriage will be arrested in its lengthwise movement being determined by the stop $e'$, as before stated. The extent of lengthwise movement of the carriage is determined by a stop consisting of a block $d^2$, secured to the carriage and having a downturned arm in which is located an adjusting-screw $d^3$, this screw determining the point of rest of the carriage at the time when the cutting-off tool is operating to sever the blank from the rod of stock. A pivoted stop $a'$ is located on the frame or bed of the machine and is normally held in the path of movement of the adjusting-screw $d^3$, and is drawn away from this path of movement by a pin $a^2$, secured to the side of the worm-gear $c$ and engaging the stop as the gear is rotated, this movement of the stop allowing the carriage a movement forward to its full extent. As soon as the carriage has moved forward the pin is released from engagement with the pivoted stop and the latter swings back against the side of the adjusting-screw and into its path of movement when the carriage has been moved backward sufficiently by the carriage-feed lever $c^2$ to allow of this movement.

A bearing $s$ is adjustably secured to the standard $e$ on the rear end of the carriage and is adapted to receive the thrust of the lever $c^2$. This bearing is adjustable toward and from the fulcrum of said lever, whereby the extent of lengthwise movement of the carriage is varied, and consequently the length of blank to be operated upon by the cutting-tools borne on the carriage that determine the length of body of the screw-blank. As soon as this extent of backward movement of the carriage is reached a fall in the cam $c'$ allows the carriage to be moved forward a slight distance to enable the forming-tools to be disengaged and moved away from the screw-blank, when a rise in the cam $c'$ causes the lever $c^2$ to throw the carriage back until the inner end of the adjusting-screw $d^3$ has passed beyond the pivoted stop $a'$. A fall on the cam then frees the lever and the carriage moves forward to the point of rearward rest with the adjusting-screw $d^3$ resting against the pivoted stop $a'$, when the cutting-off tool operates to sever the screw-blank from the rod of stock I.

In the operation of the machine to cut a comparatively thick head as compared with the body part the bearing $s$ will be located so near the fulcrum that that point on the lever resting against it will have so slight a movement as to cause the carriage to stop with the side of the pivoted stop still resting against the side of the screw $d^3$, and in order to cause the carriage to be thrust back far enough so that the pivoted stop $a'$ will swing up into the path of movement of the screw $d^3$ an auxiliary bearing $s'$ is adjustably supported above the bearing $s$ in a position to be encountered by the lever $c^2$ at a point thereon having a movement to an extent sufficient to throw the carriage back to the required distance after the bearing $s$ has ceased to have any effect to move the carriage.

We claim as our invention—

1. In a screw-machine, in combination, a reciprocating carriage, a tool-head borne on the carriage, a chuck supported on immovable standards, means for operating the chuck, and a frictional clamp extending lengthwise of the chuck and having a lengthwise reciprocation thereof, and exerting a continuous grasp upon a rod of stock, all substantially as described.

2. In a screw-machine, in combination, a reciprocating carriage, a tool-head borne on the carriage, a chuck supported on immovable standards, means for operating the chuck, and a frictional clamp secured to the carriage and extending lengthwise of the chuck, and exerting a continuous grasp upon a rod of stock, all substantially as described.

3. In combination with a blank-holder, a tool-head automatically movable thereof, a tool-holder supported on and automatically movable of the tool-head, means for moving the tool-holder, a frictional clamp extending lengthwise of the blank-holder, and exerting a continuous grasp upon a rod of stock, and means for operating the frictional clamp, all substantially as described.

4. In a screw-machine, in combination, a reciprocating carriage, a tool-head borne on the carriage, a tool-holder supported on and automatically movable of the tool-head, means for moving the tool-holder, a chuck supported on immovable standards, means for operating the chuck, and a frictional clamp supported on the carriage and extending lengthwise of the chuck, all substantially as described.

5. In combination with a blank-holder supported on fixed standards, means for operating the blank-holder, a reciprocating carriage supported in operative relation to the blank-holder, a tool-head secured to the carriage in operative relation to one end of the blank-holder, and a friction-clamp secured to the carriage at the opposite end of the blank-holder, all substantially as described.

6. In combination with a blank-holder supported on fixed standards, means for operating the blank-holder, a carriage movable longitudinally of the blank-holder, a tool-head supported on one end of the carriage and in operative relation to one end of the blank-holder, and a friction-clamp secured to the carriage at the opposite end of the blank-holder, and means for operating the clamp, all substantially as described.

7. In combination with a blank-holder supported on fixed standards, means for operating the blank-holder, a carriage movable longitudinally of the blank-holder, a tool-head supported in operative relation to one end of the blank-holder on one end of the carriage, a tool-holder movable on the tool-head radially of the blank-holder and in operative relation to one end thereof, and a frictional clamp secured to the carriage at the opposite end of the blank-holder, and means for operating the frictional clamp, all substantially as described.

8. In combination with a blank-holder rotatively supported in fixed standards, means for operating the blank-holder, a carriage underlying the blank-holder and movable longitudinally thereof, a tool-head secured to the carriage in front of the blank-holder and in operative relation thereto, a tool-holder movable on the tool-head radially of the blank-holder and in operative relation to one end thereof, a frictional clamp rotatively supported on the rear end of the carriage and extending into the blank-holder, and means for operating the frictional clamp, all substantially as described.

9. In combination with the chuck of a screw-machine, a die-plunger supported in operative relation to the chuck, a slotting-saw, a reciprocating feed-plunger bearing a friction-clutch, means for reciprocating the feed-plunger longitudinally and means for reciprocating it laterally to a position in line with and to operate the die-plunger and also in connection with the slotting-saw, all substantially as described.

10. In combination with the chuck of a screw-machine, a feed-plunger reciprocated in line with the axis of the chuck, a die-plunger reciprocated in line with the axis of the chuck, a slotting-saw, and means whereby the feed-plunger in its longitudinal reciprocation operates the die-plunger and in connection with the slotting-saw, all substantially as described.

11. In combination with the chuck of a screw-machine, a carriage movable laterally of the chuck and supporting a die-plunger and a slotting-saw, means for moving the carriage, a feed-plunger movable laterally of the chuck and longitudinally of itself whereby it operates the die-plunger and in connection with the slotting-saw, all substantially as described.

12. In combination, a chuck, a feed-plunger bearing a friction-clutch, means for operating the clutch and chuck relatively to each other, a die-plunger, means for operating the die-plunger and chuck relatively to each other, a slotting-saw, and means for forcing the feed-plunger against the die-plunger and also for reciprocating it in operative relation with the saw, all substantially as described.

13. In combination in a chuck, a hollow shaft the wall of the opening in which has a beveled surface, chuck-jaws supported in a chuck-shaft and having surfaces coöperating with the beveled surface on the hollow shaft, chuck-jaw levers pivotally supported in an adjustable support on the shaft, a split threaded collar fitting a threaded portion of the shaft and in engagement with the lever-support whereby both are moved simultaneously in either direction lengthwise with the shaft, means for drawing the opposite portions of the split ring together, and means for operating the chuck-jaw levers to open and close the chuck-jaws, all substantially as described.

14. In combination in a chuck, a hollow shaft the wall of the opening in which has a beveled surface, chuck-jaws supported in the chuck-shaft and having beveled surfaces coöperating with the beveled surface in the wall of the opening in the shaft, chuck-jaw levers pivotally supported in an adjustable support movable lengthwise of the shaft, a threaded collar fitting a threaded portion of the shaft and in engagement with the lever-support to move it lengthwise of the shaft, and means for operating the chuck-jaw levers whereby the chuck-jaws are opened and closed, all substantially as described.

15. In a feed device, in combination, a hollow chuck-shaft the wall of the opening in which has a beveled surface, chuck-jaws supported in the chuck-shaft and having beveled surfaces coöperating with the beveled surface in the wall of the opening in the shaft, chuck-jaw levers pivotally supported on the shaft with their inner ends in engagement with the chuck-jaws, means for operating the levers whereby the jaws are opened and closed, a friction-clamp located in axial alinement with the chuck-shaft, and means for changing the relative position of the chuck-shaft and friction-clamp, all substantially as described.

16. In combination in a feed device, a hollow chuck-shaft the wall of the opening in which has a beveled surface, chuck-jaws borne in the chuck-shaft and having beveled surfaces coöperating with the beveled surface in the wall of the opening in the shaft, chuck-jaw levers pivotally supported in a lever-support adjustably supported on the shaft, means for adjusting the lever-support, means for operating the chuck-jaw levers whereby the chuck-jaws are opened and closed, a friction-clamp located in axial alinement with the chuck-shaft, and means for changing the relative position of the chuck-shaft and friction-clamp, all substantially as described.

17. In a feed device, in combination, a hollow shaft the wall of the opening in which has a beveled surface, chuck-jaws supported in the chuck-shaft and having beveled surfaces coöperating with the beveled surface in the wall of the opening in the shaft, chuck-jaw levers pivotally supported in a support movable lengthwise of the shaft, a threaded collar fitting a threaded portion of the shaft and in engagement with the lever-support to move it lengthwise of the shaft, means for operating the chuck-jaw levers whereby the chuck-jaws are opened and closed, a friction-clamp located in axial alinement with the chuck-shaft, and means for changing the relative position of the chuck-shaft and friction-clamp, all substantially as described.

18. In a feed device, in combination, a hollow chuck-shaft the wall of the opening in which has a beveled surface, chuck-jaws supported in the chuck-shaft and having beveled surfaces coöperating with the beveled surface in the wall of the opening in the shaft, chuck-jaw levers pivotally supported on the shaft with their inner ends in engagement with the chuck-jaws and their outer ends located in the path of movement of a chucking-cone, the chucking-cone mounted on the shaft, means for reciprocating the chucking-cone whereby the chuck-jaws are opened and closed, a friction-clamp located in axial alinement with the chuck-shaft, and means for changing the relative position of the chuck-shaft and friction-clamp, all substantially as described.

19. A lever, means for operating the lever, a carriage, and a thrust-bearing borne on the carriage and adjustable toward and from the fulcrum of the lever, all substantially as described.

20. A lever, means for operating the lever, a carriage, a thrust-bearing borne on the carriage and adjustable toward and from the fulcrum of the lever, and an auxiliary bearing borne on the carriage at a point farther removed from the fulcrum of the lever than the thrust-bearing, all substantially as described.

21. A movable carriage, means for moving the carriage, an adjustable stop located on the carriage to arrest its forward movement at a point back of that point at which it finally stops in its forward movement, a latch intermittently interposed in the path of movement of the adjustable stop, and means for operating the latch, all substantially as described.

22. A movable carriage, a lever for moving the carriage, a thrust-bearing borne on the carriage in the path of movement of the lever and adjustable toward and from the fulcrum thereof, and an adjustable stop located on the carriage to arrest its forward movement at a point back of that point at which it finally stops in its forward movement, all substantially as described.

23. A movable carriage, a lever for moving the carriage, a thrust-bearing borne on the carriage in the path of movement of the lever and adjustable toward and from the fulcrum thereof, an auxiliary bearing farther removed from the fulcrum of the lever than is the thrust-bearing, and an adjustable stop located on the carriage to arrest its forward movement at a point back of that point at which it finally stops in its forward movement, all substantially as described.

24. A movable carriage, a lever for moving the carriage, a thrust-bearing borne on the carriage in the path of movement of the lever and adjustable toward and from the fulcrum thereof, an adjustable stop located on the carriage to arrest its forward movement at a point back of that point at which it finally stops in its forward movement, a latch intermittently interposed in the path of movement of said stop, and means for operating the latch, all substantially as described.

25. A movable carriage, a lever for moving the carriage, a thrust-bearing borne on the carriage in the path of movement of the lever and adjustable toward and from the fulcrum thereof, an auxiliary bearing farther removed from the fulcrum of the lever than is the thrust-bearing, an adjustable stop located on the carriage to arrest its forward movement at a point back of that point at which it finally stops in its forward movement, a latch intermittently interposed in the path of movement of the adjustable stop, and means for operating the latch, all substantially as described.

CASPAR W. METTLER.
ADOLF METTLER.
JACOB METTLER.

Witnesses:
ARTHUR B. JENKINS,
JULIA STERN.